(12) United States Patent
Asmari et al.

(10) Patent No.: US 12,455,534 B2
(45) Date of Patent: Oct. 28, 2025

(54) LIGHT DETECTION AND RANGING

(71) Applicant: Envisics Ltd, Milton Keynes (GB)

(72) Inventors: Abdullah Asmari, Milton Keynes (GB); Timothy Smeeton, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 380 days.

(21) Appl. No.: 18/005,458

(22) PCT Filed: Jun. 7, 2021

(86) PCT No.: PCT/EP2021/065137
§ 371 (c)(1),
(2) Date: Jan. 13, 2023

(87) PCT Pub. No.: WO2022/028752
PCT Pub. Date: Feb. 10, 2022

(65) Prior Publication Data
US 2023/0266712 A1  Aug. 24, 2023

(30) Foreign Application Priority Data
Aug. 5, 2020 (GB) ...................................... 2012155

(51) Int. Cl.
*G03H 1/22* (2006.01)
*G01S 17/894* (2020.01)
*G03H 1/30* (2006.01)

(52) U.S. Cl.
CPC ......... *G03H 1/2294* (2013.01); *G01S 17/894* (2020.01); *G03H 2001/306* (2013.01)

(58) Field of Classification Search
CPC .. G03H 1/2294; G03H 2001/306; G03H 1/00; G03H 1/0005; G03H 2001/0033;
(Continued)

(56) References Cited

U.S. PATENT DOCUMENTS

2021/0072379 A1* 3/2021 Christmas ............. G01S 7/4863

FOREIGN PATENT DOCUMENTS

GB          2574058 A       11/2019
WO     2017009848 A1         1/2017

OTHER PUBLICATIONS

Combined Search and Examiner Report for GB2012155.4, Dated Apr. 23, 2021.
(Continued)

*Primary Examiner* — Arnel C Lavarias
(74) *Attorney, Agent, or Firm* — Akerman LLP

(57) ABSTRACT

A method for light detection and ranging that includes forming a first light pattern within a region of a scene by holographic projection. The first light pattern includes n light spots arranged in a regular array. A light return signal is received from each light detection element of an array of light detection elements directed at the region of the scene. The intensity of the light return signals is assessed. If the light return signals do not meet at least one signal validation criterion, a second light pattern is formed within the region of the scene by holographic projection. The second light pattern includes m light spots arranged in a regular array, wherein m≠n. A time-of-flight in association with each light spot of the second light pattern is then determined.

20 Claims, 10 Drawing Sheets

(58) Field of Classification Search
CPC ....... G03H 2001/02; G03H 2001/0224; G03H 1/04; G03H 1/08; G03H 1/22; G03H 1/26; G03H 2001/2605; G03H 1/30; G01S 17/894; G01S 1/70; G01S 1/703; G01S 1/7032; G01S 7/48; G01S 7/4804; G01S 7/4806; G01S 7/481; G01S 7/4814; G01S 17/00; G01S 17/02; G01S 17/88; G01S 17/89
USPC ....... 359/9, 1, 15, 22, 29, 32, 33, 35; 430/1, 430/2; 356/3, 3.01, 3.06, 3.03, 3.1, 3.11, 356/3.12, 4.01, 5.01
See application file for complete search history.

(56) References Cited

OTHER PUBLICATIONS

Search Report and Written Opinion for PCT/EP2021/065137, Dated Oct. 13, 2021.

\* cited by examiner

LIGHT DETECTION AND RANGING

RELATED APPLICATIONS

This application claims the benefit under 35 U.S.C. § 371 of the filing date of International Patent Application No. PCT/EP2021/065137, having an international filing date of Jun. 7, 2021, which claims priority to United Kingdom Application No. 2012155.4, filed Aug. 5, 2020, the contents of both of which are incorporated herein by reference in their entirety.

FIELD

The present disclosure relates to a holographic projector for projecting light patterns. The present disclosure also relates to light detection and ranging, "LIDAR". Some embodiments relate to a method of optimising the light pattern for LIDAR. Other embodiments relate to a LIDAR system comprising a holographic projector of light patterns and a detector array.

BACKGROUND AND INTRODUCTION

Light scattered from an object contains both amplitude and phase information. This amplitude and phase information can be captured on a photosensitive plate or film using an interference technique called holography. The pattern captured on the photosensitive plate or film is referred to as a holographic recording or hologram. The hologram may be used to form a reconstruction of the object. The reconstruction of the object formed by the hologram is referred to as a holographic reconstruction. The holographic reconstruction may be formed by illuminating the hologram with suitable light.

Computer-generated holography may numerically simulate the processes used to form a hologram by interference of light. A computer-generated hologram may be calculated using a mathematical transformation. The mathematical transform may be based on a Fourier transform. The mathematical transform may be a Fourier transform or Fresnel transform. A hologram calculated by performing a Fourier transform of a target image may be referred to as a Fourier transform hologram or Fourier hologram. A Fourier hologram may be considered a Fourier domain, or frequency domain, representation of the target image. A hologram calculated using a Fresnel transform may be referred to as a Fresnel hologram.

A computer-generated hologram may comprise an array of hologram values which may be referred to as hologram pixels. Each hologram value may be a phase and/or amplitude value. Each hologram value may be constrained—e.g. quantised—to one of a plurality of allowable values. A computer-generated hologram may be displayed on a display device. The choice of allowable values may be based on the display device which will be used to display the hologram. The plurality of allowable values may be based on the capabilities of the display device.

The display device may be a spatial light modulator comprising an array of pixels. The spatial light modulator may be a liquid crystal device in which case each pixel is an individually-addressable liquid crystal cell having birefringence. Each pixel may modulate the amplitude and/or phase of light in accordance with a corresponding hologram pixel. Each pixel comprises a light-modulating element and a pixel circuit arranged to drive the light-modulating element. The hologram may be considered a light modulation pattern.

A holographic reconstruction may be formed by illuminating the displayed hologram with suitable light. The amplitude and/or phase of incident light is spatially modulated in accordance with the light modulation pattern. The light is diffracted by the spatial light modulator. The complex light pattern emanating from the display device interferes at a replay plane to form a holographic reconstruction corresponding to the target image. If the hologram is a Fourier hologram, the replay plane is in the far-field (i.e. an infinite distance from the display device) but a lens may be used to bring the replay plane into the near-field. For convenience, the holographic reconstruction itself may be referred to as an image. The holographic reconstruction is projected onto a plane away from the display device and the technique is therefore known as holographic projection. The image projected in accordance with this disclosure is referred to as a light pattern.

A light detection and ranging system may be formed using a holographic projector to project dynamically-reconfiguration light patterns onto objects in a scene. There is disclosed herein a method of optimising the holographic light pattern for light detection and ranging using an array detector.

SUMMARY

There is disclosed herein a method of light detection and ranging. The method comprises a first step of forming a first light pattern within a region of a scene by holographic projection. The first light pattern comprises n light spots arranged in a regular array. The method comprises a second step of receiving a light return signal from each light detection element of an array of light detection elements directed at the region of the scene. The method comprises a third step of assessing the intensity of the light return signals. If the light return signals do not meet (e.g. collectively meet or each individually meet) at least one signal validation criterion, the method further comprises a fourth step and fifth step. The fourth step comprises forming a second light pattern within the region of the scene by holographic projection. The second light pattern comprises m light spots arranged in a regular array, wherein m≠n. The fifth step comprises determining a time-of-flight in association with each light spot of the second light pattern.

A feature of holographic projection is that the intensity of the image formed by holographic reconstruction on the holographic replay plane by the hologram is a function of the amount of image content. This is because the hologram is a diffractive pattern that redistributes light. The more areas of the replay plane that receive light, the lower the brightness of each area receiving light. In other words, the number of image pixels of the replay image formed in the holographic replay field that are switched "on" (i.e. receive light from the hologram) determines the brightness of each "on" image pixel. For example, the brightness of each image spot of a hologram forming a replay image with two image spots is greater than the brightness of each image spot of a hologram forming a replay image with three image spots. This is not true in conventional display in which an image, not a hologram of an image, is displayed on the display device. Accordingly, the intensity of each of the m light spots of the second light pattern formed by the fourth step of the method is different to the intensity of each of the n light spots of the first light pattern formed by the first step of the method. As described below, changing the intensity of the light spot used for light detection and ranging, by changing the density of the regular array of light spots in the projected light pattern, makes it possible to optimise the technique in order to obtain more reliable results.

In the present disclosure, references to a "regular array" of light spots mean that the light spots are arranged in rows and columns. Generally, each row has the same number of light spots and each column has the same number of light spots. There is an even spacing between adjacent rows of light spots and there is an even spacing between adjacent columns of light spots. Typically, the spacing between adjacent rows and columns of light spots is the same, although this is not essential. In some embodiments, the light pattern may comprise a plurality of different regular arrays of light spots. It should be noted that each light spot of a replay image forming an array of light spots is a feature of the projected light pattern (also called an illumination pattern), and so may be formed by a single image pixel or a plurality of image pixels of the holographic reconstruction (i.e. replay image).

The applicant has previously disclosed a light detection and ranging, "LIDAR", system using a holographic projector as the light source. The holographic projector may be configured to project an array of light spots into the scene in order to obtain an array of time-of-flight measurements using a detector array comprising a plurality of individual light detecting elements. There may or may not be one-to-one correlation between the holographically-formed light spots and the individual light detecting elements. The inventors have found that the brightness of each light spot of the array of light spots projected onto an object in the scene is crucial to obtaining good point cloud data from the detector.

Good point cloud data means that there is a high degree of confidence in the time of flight measurements determined from the light return signals of the light detector elements, and thus in the corresponding point cloud distance measurements. Various factors may be used to assess the validity of the point cloud data, including magnitude of the light return signals, signal to noise ratio, magnitude of background light and the level of saturation across the data set. One factor that may be used to determining the validity of point cloud data from the detector array is whether the signal to noise ratio due to background light, corresponding to the difference between the amount of light measured by each light detecting element and the amount of background light at the location of the corresponding light spot within the scene, exceeds a threshold. Another factor that may be used to determining the validity of point cloud data from the detector array is whether the light return signals include interference or crosstalk. Light interference or crosstalk may be due to light detecting elements measuring light from a location within the scene that it not associated with the location or field of view of its corresponding light spot (e.g. returned light from overlapping or adjacent light spots or other light sources within the scene). Electrical crosstalk may also occur due to interference between signalling associated with adjacent elements of the detector array.

There is disclosed herein a method of light detection and ranging including the steps of assessing the integrity of the light return signal and changing the spot density of the illumination pattern if the return signal fails the integrity check. Notably, the inventors have identified how the fundamental relationship between brightness and amount of image content in holography can be utilized for optimizing a LIDAR system. In particular, this property is used to fine tune the illumination pattern in order to obtain better point cloud data in a holographic light detection and ranging system. This approach is unique to holography and cannot be derived from a conventional display or LIDAR system in which a change in feature density in the illumination pattern does not change the brightness of each feature. There are disclosed herein a number of particular embodiments that provided an improved holographic LIDAR system based on these core concepts. These improvements exploit the synergy between holography and LIDAR that does not exist with other light projection techniques.

It will be understood from the detailed description that follows that each light detection element of the array of light detection elements corresponds to either (1) a light spot of the array (in which case a light return signal may be received if there is an object in the corresponding part of the scene) or (2) a space or gap between light spots of the array (in which case no light return signal should be expected from the scene). Each light detection element is therefore considered to be either "active" (case 1) or "inactive" (case 2) for each exposure time. Each light detection element is continually changing between being active and inactive depending on any changes to the light pattern. There may be more inactive than active light detection elements during each exposure time. In some embodiments, differences between the outputs of the active light detection elements and outputs of the inactive light detection elements are assessed to determine if the at least one validation criterion is satisfied. The inactive light detection elements should not provide any output (above background) during the exposure time. That is, the light return signal (above background) from each inactive light detection element should be zero. For example, if the number of light detection elements providing an output indicative of no object is less than the number of inactive light detection elements (or less than e.g. 75% of the number of inactive light detection elements), the system may be operating in a sub-optimal configuration and may benefit from a change in the number of light spots of the projected light pattern. For example, if the difference between the output of an inactive light detection element (or e.g. 75% of the inactive light detection elements) and the output of an active light detection element receiving return light from an object in the scene is less than a threshold value, the system might also be operating in a sub-optimal configuration and might benefit from a change in the number of light spots.

In embodiments, the at least one validation criterion may be assessed for each exposure time (of the light detector) or may be cumulatively assessed for a plurality of successive exposure times (of the light detector). The plurality of successive exposure times may correspond to the same light pattern. For example, the plurality of successive exposure times may correspond to a respective plurality of projections of the same structured light pattern. In some embodiments, only one photon is measured for each "exposure time" of the detector. This is unlike a conventional image sensor which measures the number of photons received in the exposure time. The reason for the difference is that, in accordance with this disclosure, the time of arrival of the photon is measured so only the first photon to arrive within the exposure period is critical. All subsequent photons are ignored.

One type of validation criterion may be defined such that a light return signal corresponding to each light spot of the replay image formed in the scene can be detected and distinguished from background light within the scene. In particular, the brightness of each light spot formed in the scene must be sufficiently high compared to the brightness of background light at the corresponding location in the scene so that a generally reliable light return signal can be detected (e.g. the signal to noise ratio of the light return signal exceeds a threshold). Thus, if this validation criterion is met, valid point cloud data may be obtained from the detector.

Accordingly, the method may further comprise determining the background light intensity of the scene, optionally, using a background light detector/sensor. In some embodiments, the background light intensity varies across the scene. Therefore, in some embodiments, a plurality of background light intensities of the scene is determined. For example, the method may comprise determining a background light profile or distribution of the scene. A background light intensity is associated with each light detection element. In some embodiments, the same background light intensity is associated with each light detection element but, in other embodiments, a different background light intensity of the scene is associated with each light detection element or subsets of light detection elements. For example, a first background light intensity may be associated with a first subset (group) of light detection elements and a second background light intensity may be associated with a second subset (group) of light detection elements. For example, the nearest measurement of background light intensity may be associated with each light detection element. Accordingly, it may be understood that reference herein to background light intensity may mean a background light intensity selected from a plurality of background light intensities associated with the scene. In some embodiments in which the at least one signal validation criterion relates to the total intensity detected by light detection elements directed at a light spot, the determined background light intensity may be sum of the background light intensities associated with those light detection elements.

The at least one signal validation criterion may be that the ratio of (1) the total intensity detected by light detection elements directed at a light spot of the first light pattern to (2) the determined background light intensity exceeds a threshold value. Alternatively, the at least one signal validation criterion may be that the total intensity detected by the array of light detection elements exceeds a threshold intensity value. In these cases, m<n.

The threshold value may be in the range 1.2 to 2.0. The threshold value may be in the range 1.4 to 1.6. In some examples, the threshold value is 1.5.

The problem of data loss due to interference from background light, such as sunlight or another LIDAR system, or a loss of signal strength is addressed. The illumination power is distributed over fewer spots (i.e. the density of spots per solid angle is reduced) if the background light level is high. The spot density may be adjusted in the entire scene or in a portion of the scene. Lower spot density may reduce the angular resolution of the point cloud that is generated but ensures that valid data is obtained above the background noise floor. The illumination power is distributed over fewer spots (i.e. the density of spots per solid angle is reduced) if the photons detected from the object are low (e.g. for reflection from a distant object). This also ensures that valid data is obtained above the noise floor.

The at least one signal validation criterion may be that intensity detected by each light detection element of the array of light detection elements exceeds a threshold value. The threshold value may be the background light intensity or a multiple, such as 1.5, of the background light intensity. Alternatively, the at least one signal validation criterion may be that the intensity detected by each light detection element above background exceeds a threshold intensity value.

Another type of validation criterion may be defined such that the light reflected from the scene due to illumination with the regular array of light spots is evenly distributed over the array of light detection elements directed at the scene. In particular, the brightness of each light spot formed in the scene must not be too high such that light reflected from the corresponding location in the scene is received not only by the light detection element(s) directed to receive light from that location (i.e. "active" light detection elements) but also by light detection elements that are directed to receive light from adjacent locations corresponding to spaces or gaps between light spots in the array (i.e. "inactive" light detection elements). This may be referred to as "crosstalk" and is a form of light interference. Generally, as long as inactive light detection elements do not receive light above a threshold intensity (e.g. background light level), the light return signals from active light detecting elements may be considered to be reliable (i.e. to provide an accurate data point for the point cloud). In particular, if inactive light detecting elements do not receive light due to crosstalk, then it is highly likely that the active light detecting elements also do not receive light due to crosstalk. Thus, if this validation criterion is met, valid point cloud data may be obtained from the detector.

Accordingly, the at least one signal validation criterion may be that the array of light detection elements has been substantially evenly illuminated and m>n. For example, it is considered that the array of light detection elements has been substantially evenly illuminated if the intensity detected by each light detection element corresponding to the space between adjacent light spots of the array of light spots is less than 50% such as less than 30% or less than 10% of the intensity detected by a light detection element corresponding to a light spot. The at least one signal validation criterion may be that the number light detection elements that have been saturated is less than a threshold number of light detection elements. In some cases, a light detection element may be considered "saturated" when more than one photon is received given exposure time. The at least one signal validation criterion may be that the number of light detection elements receiving substantially no light (above background) is greater than a threshold number of light detection elements. In other words, the at least one signal validation criterion may be that the number of light detection elements receiving light of the first light pattern is greater than a threshold number of light detection elements. The at least one signal validation criterion may be that the number of light detection elements receiving substantially less light than nearby detection elements is greater than a threshold number of light detection elements. For example, less than 50% (such as less than 30%) of nearby detection elements.

The number of spots that the illumination power is distributed over is configured to maximise the efficiency of photon detection by the array detector. When the power is spread over few widely spaced spots, some pixels of the detector are saturated and many pixels barely measure any photons. This is inefficient detection-many photons that could be measured are not measured. If the same power is distributed over more spots the detector pixels are more uniformly illuminated. This is optimum efficiency of detection. The density of spots (per solid angle) is adjusted for a particular region of the scene based on result from the previous point cloud frame.

In some embodiments, each light pattern is a holographic reconstruction formed by illuminating a respective hologram displayed on a spatial light modulator.

In a simple configuration, each light pattern is formed from one hologram. In these configurations, each hologram is therefore a hologram of the entire light pattern. These configurations provide the maximum rate of change of the light pattern that the hardware can support.

In some embodiments, the first hologram corresponding to the first light pattern comprises a first number of pixels and a second hologram corresponding to the second light pattern comprises a second number of pixels. The second number of pixels may be different to the first number of pixels.

The number of pixels of the hologram affects how quickly the hologram can be calculated and how much memory is required to store the hologram. In some embodiments, the number of hologram pixels is reduced—e.g. when the spot density of the illumination pattern is reduced—in order to make more efficient use of the available resources when the opportunity arises.

A first hologram corresponding to the first light pattern may be displayed on the spatial light modulator in accordance with a first tiling scheme. A second hologram corresponding to the second light pattern may be displayed on the spatial light modulator in accordance with a second tiling scheme. The second tiling scheme may be different to the first tiling scheme.

In some embodiments, each hologram has fewer pixels than the spatial light modulator and each hologram is "tiled" onto the spatial light modulator. Tiling uses the extra pixels of the spatial light modulator to display repeats of at least part of the hologram. Tiling results in the display of a tiled pattern on the spatial light modulator, wherein the tiled pattern comprises a plurality of tiles. A tile is continuous, contiguous group of pixels of the hologram. The plurality of tiles may comprise any number of full-tiles and any number of part-tiles of the hologram. A full-tile is the complete hologram. That is, a full-tile is the complete, contiguous group of pixels of the hologram. A part-tile is a subset of the hologram. That is, a part-tile is a continuous, contiguous subset of the pixels of hologram. In some embodiments, tiling is used to fill the spatial light modulator. That is, tiling may use all pixels of the spatial light modulator to display full-tiles and/or part-tiles of the hologram. In some embodiments, all tiles are quadrangular. In some embodiments, all tiles are rectangular. Each tile may have any size or aspect ratio, as required.

Each tiling scheme in accordance with the present disclosure results from a unique pixel mapping scheme which maps groups of contiguous pixels of a hologram onto the pixels of the spatial light modulator such that all pixels of the spatial light modulator correspond to one pixel of a hologram. It will therefore be understood that some pixels of the hologram correspond to multiple pixels of the spatial light modulator. It may be said that there is a one-to-many correlation between at least some pixels of each hologram and the pixels of the spatial light modulator. The number of tiles may be two to twelve, such as four to ten. Each tile comprises at least two pixels. Each tiling scheme may be selected from a plurality of tiling schemes such as two to twelve tiling schemes. In some embodiments, each tiling scheme is selected from a group comprising four or eight different tiling schemes. In some embodiments, each tiling scheme comprises at least one full-tile. The present disclosure extends to any combination of full-tiles and part-tiles that can fit on the display device.

There is disclosed herein a method comprising tiling of two or more holograms with different sizes (thereby sampling different numbers of the replay field pixels), each hologram directing light into different regions of the scene where the pixel density is required.

In some embodiments, at least one of the first light pattern and second light pattern is formed by (rapidly) interlacing in time a plurality of (different) holographic reconstructions from a respective plurality of (different) holograms.

In some embodiments, at least one light pattern comprises a plurality of light pattern components such as a first light pattern component and a second light pattern component. The first light pattern component may be formed from a first hologram and the second light pattern component may be formed from a second hologram. The light pattern components are formed rapidly in succession in order to form the complete light pattern. For example, the first light pattern component may comprise every other light spot of a regular array of light spots in a first checkerboard patten and the second light pattern component may comprise the other light spots of the regular array of light spots in a second checkerboard pattern, wherein the second checkerboard pattern is opposite (or complementary) to the first checkerboard pattern. It may be said that the first light pattern component comprises a first subset of lights spots of the light pattern and the second light pattern component comprises a second subset of light spots of the light pattern, wherein the first subset and second subset collectively form all light spots of the regular array of light spots forming the light pattern. For example, the light pattern components may all be displayed within a video frame period such as within 16 ms. In some embodiments, the light pattern components may all be displayed in less than 2 ms.

The number of holograms forming the first light pattern may be different to the number of holograms forming the second light pattern. The regular array of n light spots of the first light pattern may be a subset of the regular array of m light spots of the second light pattern, or vice versa.

In a notable further technical advancement, the inventors have identified a highly efficient way of changing the density of light spots. This solution does not require any new holograms to be calculated or even retrieved from memory. In some embodiments, at least one of the light patterns is formed by interlacing a plurality of light pattern components as described above. In some embodiments, the density of light spots is changed by selective interlacing of light pattern components. For example, a first light pattern may be formed by interlacing a first checkerboard pattern of light spots (every other light spot) and a second checkerboard pattern of light spots (the interstitial light spots). The light spot density may be halved by omitting reconstruction of either the first light spot pattern or the second light spot pattern. In other words, omitting every other light spot.

In a first example in which n>m, the first light pattern is formed by interlacing in time an array of m light spots formed from a first hologram and an array of x light spots formed from a second hologram, and wherein the second light pattern is formed (entirely) from the first hologram. In a second example in which m>n, the second light pattern is formed by interlacing in time an array of n light spots formed from a first hologram and an array of y light spots formed from a second hologram, and wherein the first light pattern is formed (entirely) from the first hologram.

There is also disclosed herein a light detection and ranging system. The system comprises a holographic projector, a light detector array and a controller. The holographic projector is arranged to form light patterns within a region of a scene. Each light pattern comprises a plurality of light spots arranged in an array. The light detector array comprises an array of light detection elements directed at the region of the scene. The controller is arranged to assess the intensity of light return signals received by the light detector array in response to formation of a first light pattern comprising a regular array of n light spots in the region of the scene (by the holographic projector). If the light return signals do not collectively meet at least one signal validation criterion, the controller is further arranged to instruct the holographic projector to form a second light pattern within the region of the scene. The second light pattern comprises a regular array of m light spots, wherein m≠n. The controller is additionally arranged to determine a time-of-flight in association with each light spot of the second light pattern.

In some embodiments, the system is further arranged to determine the background light intensity of the scene. The at least one signal validation criterion may be at least one selected from the group comprising: the ratio of the total intensity detected by light detection elements directed at a light spot of the first light pattern to the determined background light intensity exceeds a threshold value and m<n; the ratio of the total intensity detected by the array of light detection elements to the determined background light intensity exceeds a threshold intensity value and m<n; the array of light detection elements has been substantially evenly illuminated and m>n; the number light detection elements that have been saturated is less than a threshold number of light detection elements and m>n; and the number of light detection elements receiving light of the first light pattern is less than a threshold number of light detection elements and m>n.

The at least one signal validation criterion may be that total intensity above background light levels detected by the array of light detection elements exceeds a threshold value. The at least one signal validation criterion may additionally or alternatively be that the ratio of intensity from object (i.e. corresponding a light return signal from a light spot of the first light pattern) divided by background intensity exceeds a threshold value.

There is further disclosed herein a method of light detection and ranging. The method comprising: displaying a hologram of a light pattern on a spatial light modulator; illuminating the hologram in order to form a holographic reconstruction of the light pattern on a region of the scene, wherein the holographic reconstruction comprises n light spots arranged in a regular array within the region of the scene; receiving a light return signal from each light detection element of an array of light detection elements directed at the region of the scene; assessing the intensity of the light return signals and if the light return signals do not collectively meet at least one signal validation criterion, the method further comprises: changing the hologram in order to form a modified holographic reconstruction on the region of the scene, wherein the modified holographic reconstruction comprises m light spots arranged in a regular array within the region of the scene, where m≠n; and determining a time-of-flight in association with each light spot of the m light spots.

In some examples, the spatial light modulator applies phase-only modulation to the light received. The spatial light modulator may thus be a phase-only spatial light modulator. This may be advantageous because no optical energy is lost by modulating amplitude. Accordingly, an efficient holographic projection system is provided. However, the present disclosure may equally be implemented on an amplitude-only spatial light modulator or an amplitude and phase (complex) spatial light modulator. It may be understood that the hologram will be correspondingly phase-only, amplitude-only or fully-complex.

The term "light return signal" is used herein to refer to the output provided by each light detection element. The light return signal may comprises a first component attributed to reflection of light of the projected light pattern from an object, or part of an object, in the corresponding part of the scene (that is, the sub-area of the scene corresponding to that light detection element) and a second component that is background noise—e.g. ambient light or light from another LIDAR system. Wording such as "above background" is used herein in order to make reference to the first component of the light return signal. The magnitude of the output of each light detection element may be a function of the number of photons received in the exposure time of the light detection element. In some embodiments, the validity of each light return signal is assessed. In other embodiments, the validity of a sample number of light return signals is assessed. In yet other embodiments, the validity of the light return signals is cumulatively assessed—that is, assessed as a whole.

The term "hologram" is used to refer to the recording which contains amplitude and/or phase information about the object. In this disclosure, the input, or received, hologram is a hologram. The entirety of the output, computer-generated, hologram is also a hologram—the term "hologram" encompasses the combination of a full-tile of the input hologram and additional part-tiles. The term "holographic reconstruction" is used to refer to the optical reconstruction of the object which is formed by illuminating the hologram. The term "replay plane" is used to refer to the plane in space where the holographic reconstruction is formed. The terms "image", "image region" and "replay field" refer to areas of the replay plane illuminated by light forming the holographic reconstruction. In some embodiments, the "image" comprises image spots which may be referred to as "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" or "represent" a light modulation distribution or pattern in response to receiving the plurality of control values.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "light" is used herein in its broadest sense. Some embodiments are equally applicable to visible light, infrared light and ultraviolet light, and any combination thereof.

The present disclosure refers to or describes 1D and 2D holographic reconstructions by way of example only. The holographic reconstruction may alternatively be a 3D holographic reconstruction. That is, in some examples of the present disclosure, each computer-generated hologram forms a 3D holographic reconstruction.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in a co-dependent relationship.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Optical Configuration

Figure 1:
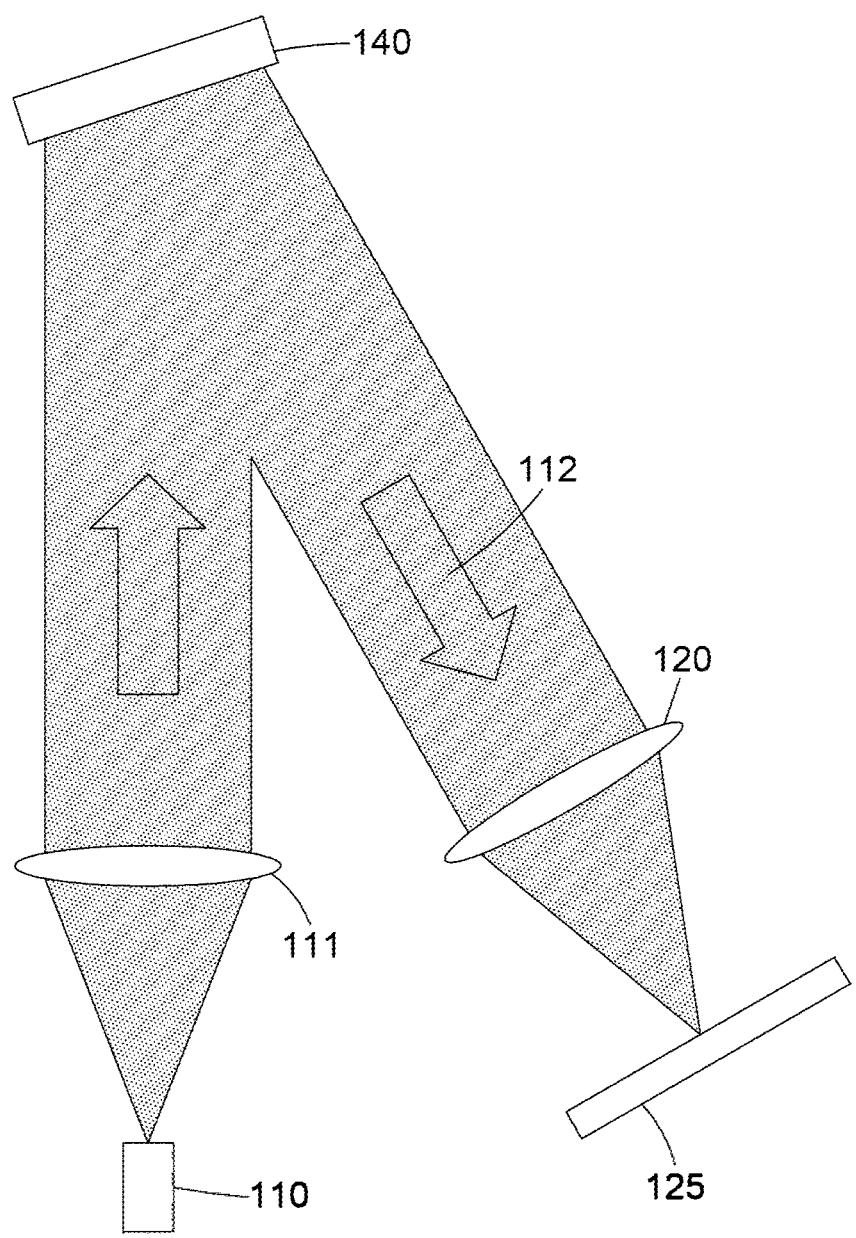
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
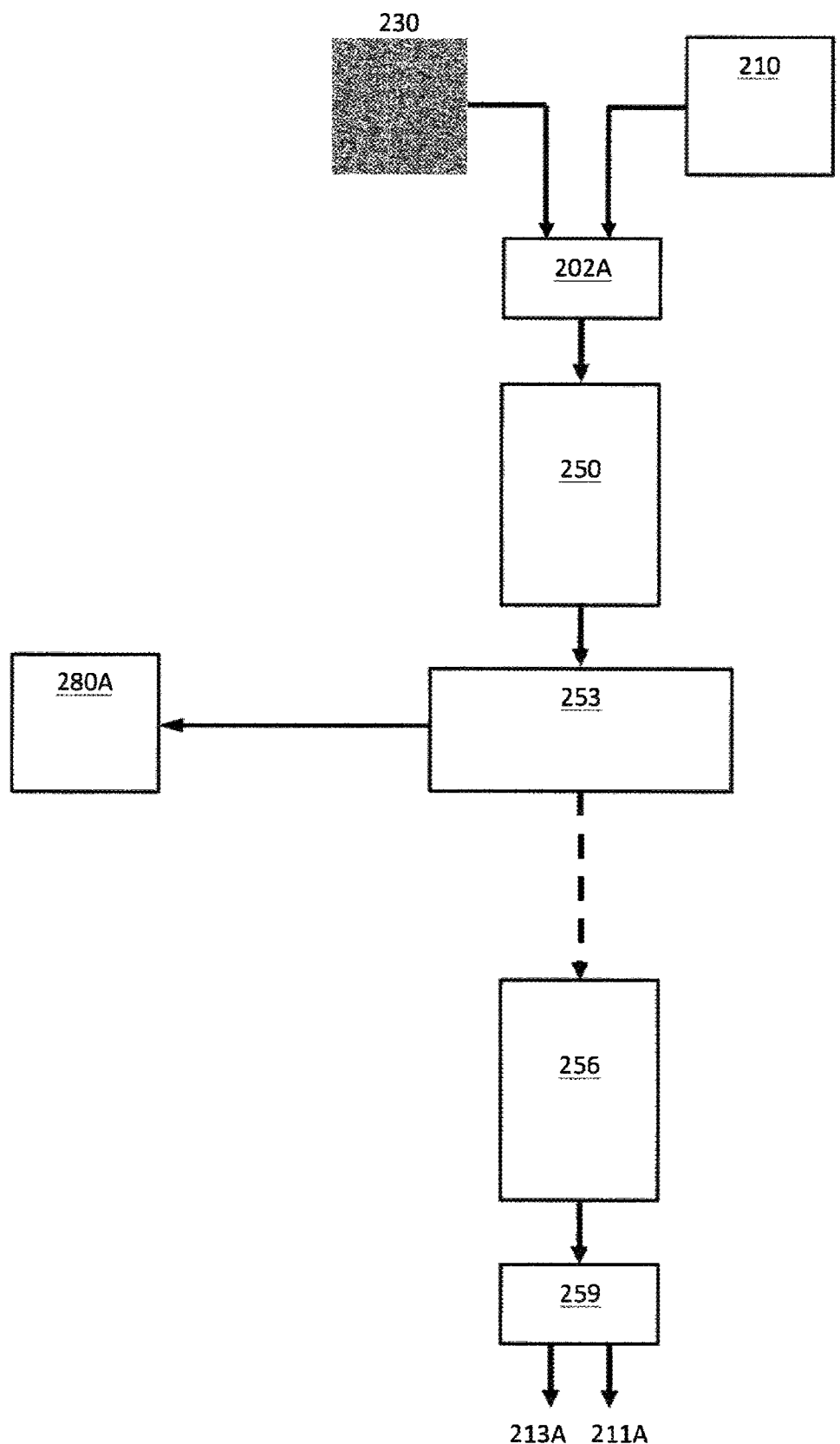
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
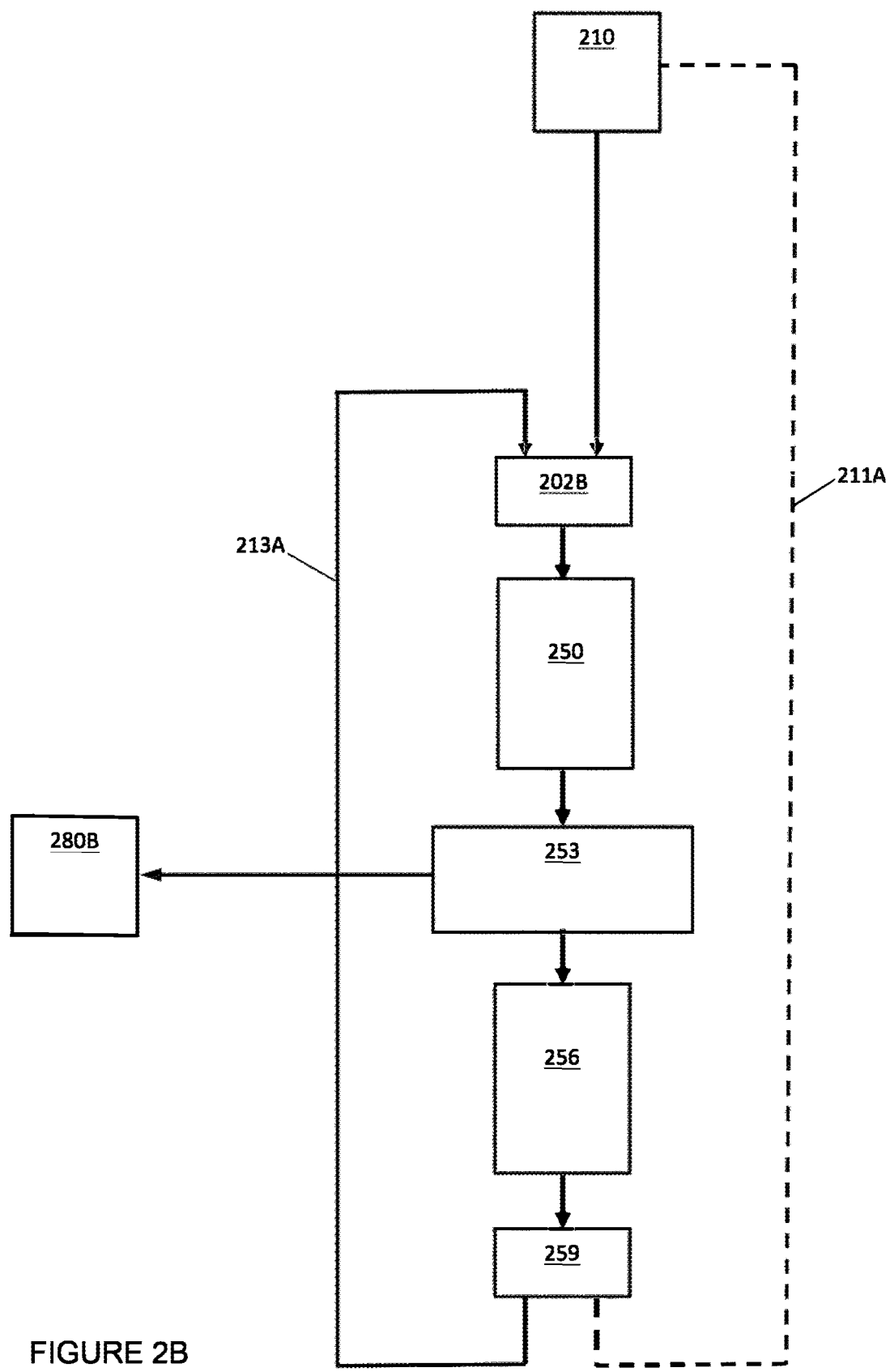
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
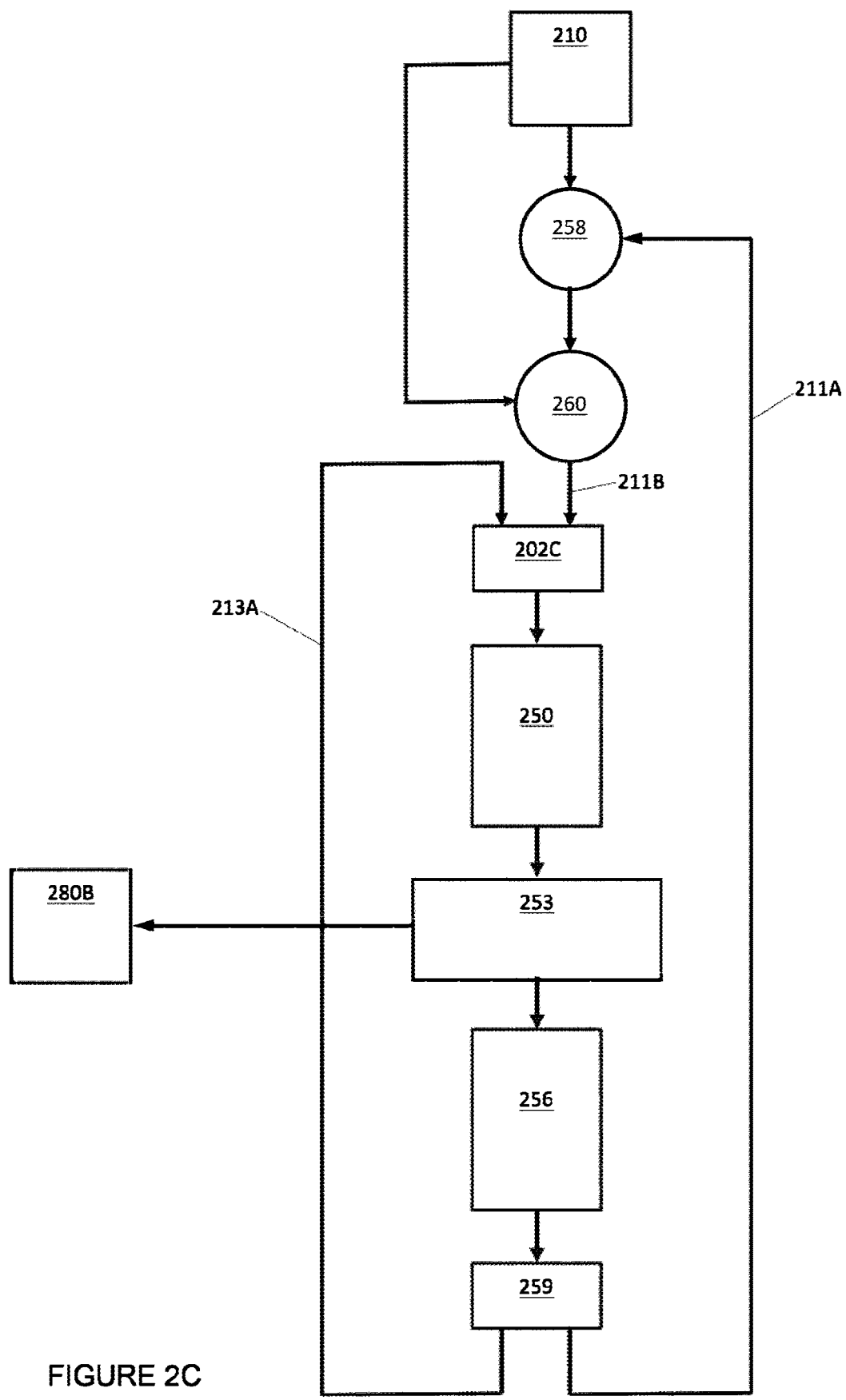
FIG. 2C illustrates alternative second and subsequent iterations of the example.

FIG. 2C represents an alternative embodiment of the second and subsequent iterations. The distribution of phase values 213A of the preceding iteration is fed-back through the processing blocks of the algorithm to the data forming step 202C of FIG. 2C. The distribution of magnitude values 211A is rejected in favour of an alternative distribution of magnitude values. In this alternative embodiment, the alternative distribution of magnitude values is derived from the distribution of magnitude values 211A of the previous iteration. Specifically, processing block 258 subtracts the distribution of magnitude values of the input image 210 from the distribution of magnitude values 211A of the previous iteration, and scales that difference by a gain factor α. Then, at processing block 260, the algorithm subtracts the scaled difference (determined at processing block 258) from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
h is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the light modulation (or diffractive) pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of pixels within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
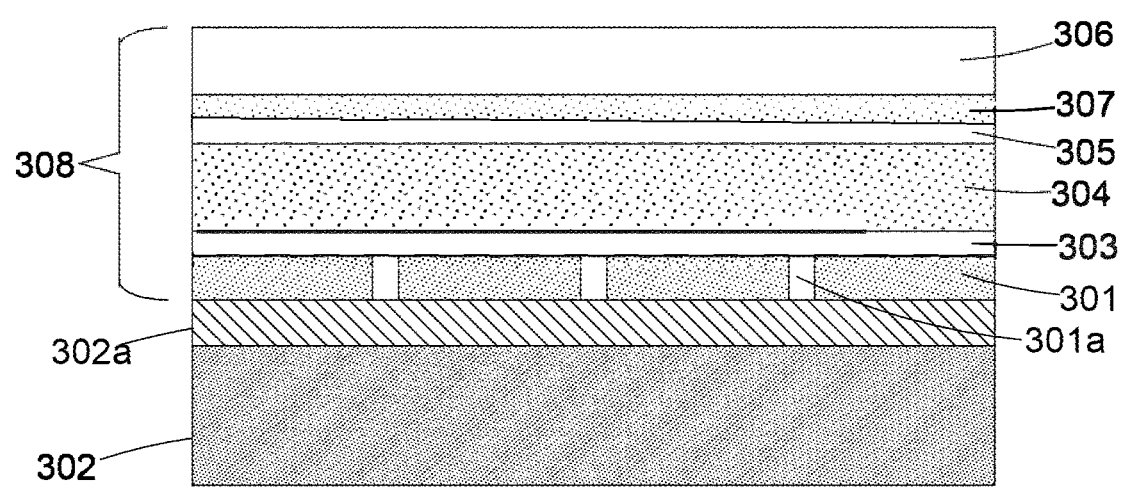
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of dynamic light patterns). However, the teachings of the present disclosure may equally be implemented using a transmissive LCOS SLM. In embodiments, the received computer-generated hologram is an input hologram to a tiling engine. The input hologram is "tiled" on the spatial light modulator in accordance with a tiling scheme and the tiling scheme is dynamically changed, for example, it is changed between input holograms. The concepts of a "tile" and "tiling" are further explained with reference to FIG. 8.

Light Detection and Ranging Using an Array of Time of Flight Measurements

The light detection and ranging, "LiDAR", system of the present disclosure is arranged to make time of flight measurements of a scene. The LiDAR system comprises a holographic projector comprising: a spatial light modulator arranged to display light modulation patterns, each light modulation pattern comprising a hologram and, optionally, a grating function having a periodicity; a light source arranged to illuminate each displayed light modulation pattern (e.g. in turn); and a projection lens arranged to receive spatially modulated light from the spatial light modulator and project a structured light pattern corresponding to each hologram onto a respective replay plane. The position of the structured light pattern on the replay plane may be determined by the periodicity of the optional grating function. The LiDAR system further comprises a detector comprising an array (e.g. 1D or 2D) of detection elements and an imaging lens arranged such that each detection element receives light from a respective sub-area of the holographic replay plane, wherein the sub-areas collectively define a field of view of the detector on the replay plane. In some embodiments, a physical Fourier lens is also included between the spatial light modulator and projection lens. In some embodiments, the projection lens forms an image of an intermediate holographic replay field formed (e.g. in free space or on a screen) between the spatial light modulator and projection lens. The optical power of a software lens displayed with the hologram and/or the optical power of a physical Fourier lens downstream of the spatial light modulator may determine the propagation distance from the hologram to the (intermediate) holographic reconstruction. In some embodiments, the holographic reconstruction (2D or 3D) may be projected directly onto the scene without a projection lens. In other words, in these embodiments, the projection lens is omitted and an intermediate holographic reconstruction upstream of the scene is not formed.

The field of view of the detector may be continuous or discontinuous. That is; the individual fields of view of the light detecting elements comprised within the detector may form a continuous or discontinuous area. That is; there may be no gaps between adjacent individual fields of view (IFOV's) of the respective light detecting elements. In other embodiments, there are gaps (or dead zones) between the individual fields of view in which no light can be detected by the system.

The light source may be a laser light source. The light may be, for example, infra-red (IR) light, visible light or ultraviolet light.

The system controller may be configured to provide an output to the detector. For example, it may provide an output indicating the timing and/or duration of light pulses, from the light source.

The grating function (also known as a phase-ramp function or a software grating) may be added to the hologram in order to provide a linear displacement of the light pattern on the (holographic) replay plane. The period of the grating function may determine the magnitude of the displacement. A repository of different grating functions may be provided, and a feedback system may be incorporated to select the required grating function from the repository of different grating functions, based on a control signal.

The system may be arranged to 'observe or 'interrogate' a plane in space, within a scene. The distance of that plane, from the holographic projector and the detector, may be variable. The system may be arranged to continually probe a scene. It may be said that the system provides a temporal sequence of light detection and ranging 'frames' (or display events). Each frame may comprise a display event (or 'an illumination event') and a detection event. Each frame has a corresponding range that defines the location of the plane in the scene that will be interrogated. The plane that will be interrogated may be substantially parallel to a plane of the source and detector. The range is a perpendicular distance between those two planes, in such an arrangement.

The structured light pattern comprises a plurality of discrete light features, wherein each discrete light feature is formed within a respective sub-area of the sub-areas that collectively define the field of view of the detector. The structured light pattern may have a non-uniform brightness across its area within the replay field. The discrete light features (called "light spots" herein) may be separated by dark areas. As noted above, a light spot or discrete light feature may be formed by a single image spot/pixel or a plurality of contiguous image spots/pixels of the holographic reconstruction (i.e. replay image). The discrete light features may be a pattern of light of graded brightness or intensity. The structured light may be characterised by its form, shape and/or pattern.

The light detection and ranging system may be used to form a temporal sequence of varying structured light patterns within a scene. The sequence may be derived from a pre-determined sequence, or it may be a random sequence, or it may be a sequence arising from selections and determinations made by the controller, based on signals or other information received during, or as a result of, previous operation of the system.

The system may be configured such that a plurality of different points (on the same plane or within a depth of focus provided by the projection lens) in the scene may be interrogated at the same time. This may be achieved by illuminating the scene with structured light (e.g. a periodic array of discrete light spots) and using an array of detection elements combined with an imaging lens such that there is correlation between discrete light spots and individual detection elements. The person skilled in the art of optics will understand how the imaging lens may be chosen based on the desired detection resolution within the scene and so a detailed description of the design of the imaging lens is not required below.

The system may be arranged to make a time of flight measurement in relation to each discrete light feature of a structured light pattern based on a detection signal from the corresponding detection element in order to form a plurality of time of flight measurements in relation to the structured light pattern. The time of flight may comprise a time that the light has taken to travel from the holographic projector, for example from the spatial light modulator, to the scene and back to the detector.

The light modulation pattern may comprise a lensing function having a focal length, wherein the distance from the spatial light modulator to the replay plane is determined by the focal length. The holographic projector, or a controller associated therewith, may be arranged to determine the focal length of the lensing function that is required to focus the structured light pattern on a replay plane of interest, based on the control signal. In some circumstances, a lensing function will not be needed in order to focus the structured light pattern correctly on a replay plane of interest.

The system controller may be arranged to determine a subsequent structured light pattern of a sequence of structured light patterns based on detection signals received from the array of detection elements. For example, the detection signals may give an indication of the distance of an object, or of a part of an object, or of the lack of an object, at a particular distance and the controller may use that information to select and control the structured light pattern that will be used next (or subsequently) to illuminate the scene.

The distance information may define the location of the replay plane in the scene for a subsequent structured light pattern. The distance information may, in other words, be the distance between the spatial light modulator and the replay plane, for that subsequent structured light pattern.

The spatial light modulator and the array of detection elements may be substantially parallel to one another and spatially separated. That is; they may occupy a common plane.

The projection lens and the imaging lens may be substantially parallel to each other. That is; they may occupy a common plane.

The projection lens and imaging lens may be substantially parallel to the spatial light modulator and array of detection elements. The distance between the spatial light modulator and the replay plane (which may be referred to as the 'range' of the system) may thus be a substantially perpendicular distance.

The distance information may define a plane in the scene. The scene may comprise, or be comprised within, a detected object.

Spot Density Optimisation

Figure 4:
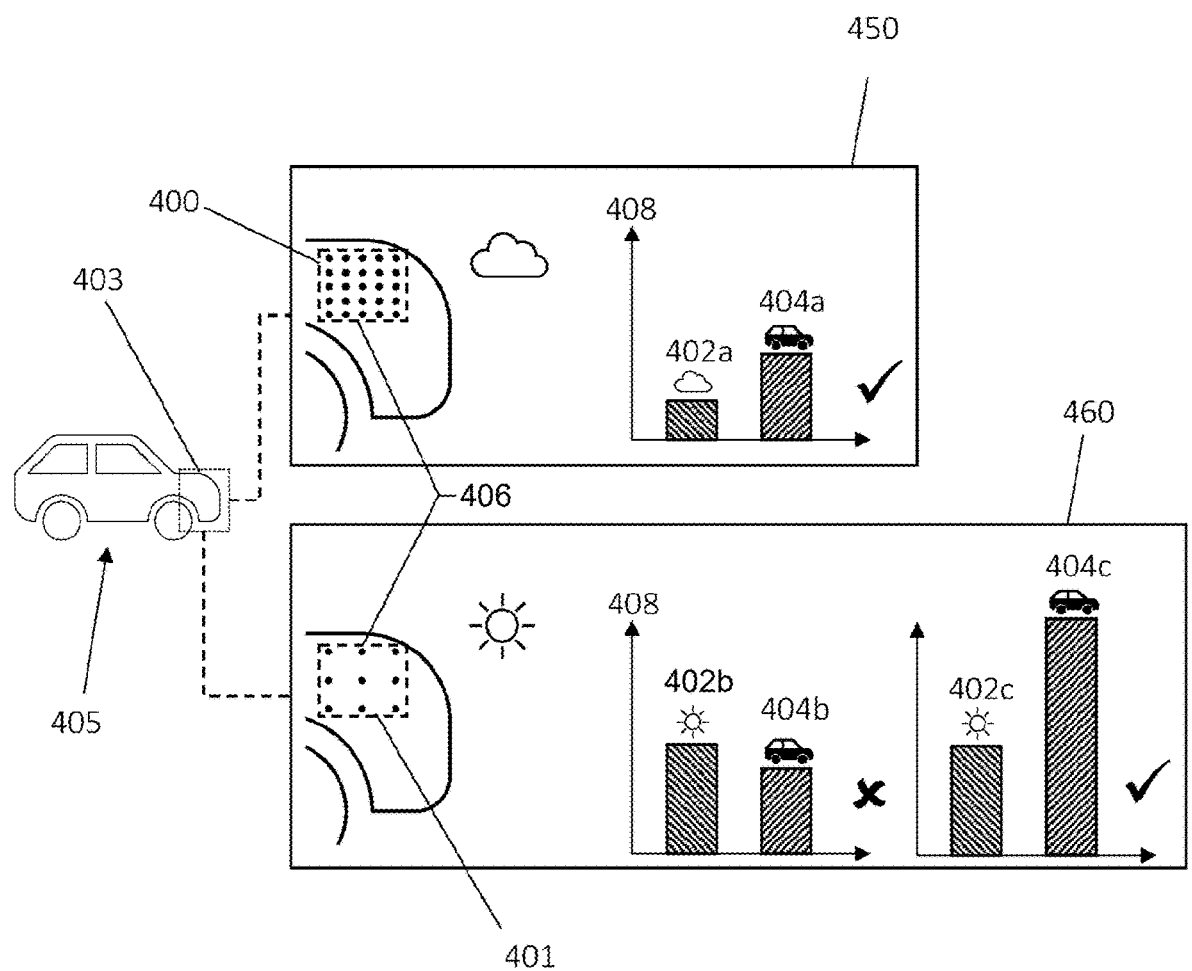
FIG. 4 illustrates an embodiment in which spot density is changed owing to ambient light conditions.

FIG. 4 shows an embodiment in which a region 403 of an object 405 is illuminated with a first light pattern 400 in low background light conditions 450 (e.g. cloudy day) and a second light pattern 401 in high background conditions 460 (e.g. sunny day). The density of light spots of the first light pattern 400 (i.e. the number of spots per solid angle) is greater than the density of light spots of the second light pattern 401. The first light pattern 400 and second light pattern 401 are formed by holographic projection so the total brightness 406 of each light pattern is the same. Each light spot of the second light pattern 401 is brighter than each light spot of the first light pattern because the second light patten 401 comprises fewer light spots than the first light pattern 400. For the avoidance of doubt, any reference in this disclosure to brightness is made as shorthand for optical power or optical energy per light pulse.

The three charts shown in FIG. 4 illustrate the light detected 408 from one light spot in three different cases. The first (left-hand side) bar 402a, 402b, 402c of each chart shows the intensity of the background light and the second (right-hand side) bar of each chart shows the intensity of the return signal from the object 405—that is, the intensity of the light reflected from the object 405. For the avoidance of doubt, reference herein to intensity means the number of photons detected per solid angle subtended from the imaging lens. Bar 404b shows how the return signal from the object 405 is too low relative to the background (bar 402b) when the first (high spot density) light pattern 400 is used in sunny conditions. In other words, the signal to noise ratio is too low or the fraction of the total light signal (402b+404b) corresponding to the light return signal (404b) is too low. Bar 404c shows how the return signal may be boosted in accordance with this embodiment by illuminating with the second (low spot density) light pattern 401, instead of the first light pattern 400, in bright conditions.

The light return signal is used to provide a plurality of time of flight measurements from a respective plurality of points in the scene. In accordance with this disclosure, before the signal processing necessary to derivate the plurality of flight measurements is performed, the overall integrity of the light return signal is assessed. If the light return signal fails the integrity check, the light return signal may be rejected and the illumination event may be repeated with a different light pattern. In other embodiments, the light return signal is still used (e.g. to calculate a point cloud corresponding to the scene or object in the scene) even if the light return signal fails the integrity check but the illumination event is still repeated with a different light pattern (e.g. different light spot density pattern). This integrity check comprises assessing whether the light return signal satisfies at least one signal validation criterion. In the embodiment described with reference to FIG. 4, the at least one signal validation criterion may be that the total intensity of the light return signal (that is, the sum of all the individual signals from all the light detection elements) exceeds a threshold value. The threshold value may be a fixed or variable. The threshold value may be the intensity of the ambient light or a multiple of the intensity of the ambient light. The multiple may be in the range 1.1 to 10.0 such as 1.1 to 5.0.

In some embodiments, the ratio of the total intensity detected by light detection elements directed at a light spot of the first light pattern to the determined background light intensity exceeds a threshold value. In other embodiments, the ratio of the total intensity detected by the array of light detection elements to the determined background light intensity exceeds a threshold intensity value. In these cases, the density of the light pattern is reduced for the next projection-detection event—i.e. m<n.

In high background light conditions 460, the illumination power is distributed over fewer spots (i.e. the density of spots per solid angle is reduced) so that the brightness of each light spot is increased. The spot density may be adjusted in the entire scene or in a portion of the scene. Lower spot density may reduce the angular resolution of the point cloud that is generated but ensures that valid data is obtained above the background noise floor.

The skilled person will understand that any number of different methods of measuring or determining the background light intensity of the scene may be employed within the scope of this disclosure and no further information is therefore required herein.

Figure 9A:
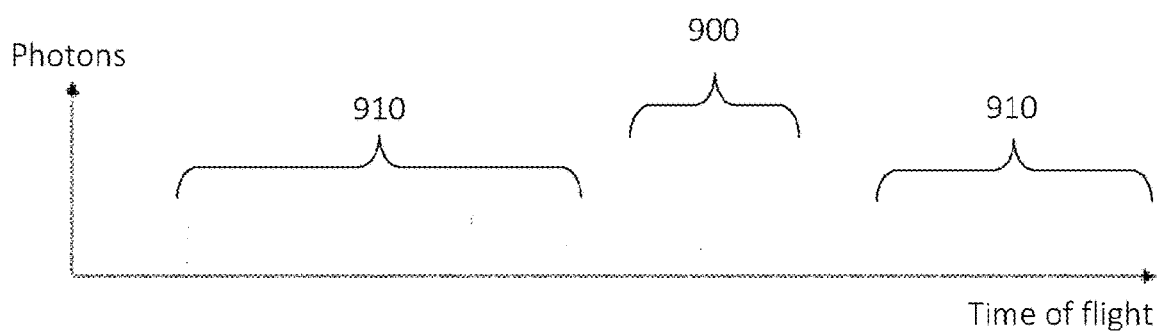
FIGS. 9A and 9B show how background light of the scene (noise) can be distinguished from signal light.
Figure 9B:
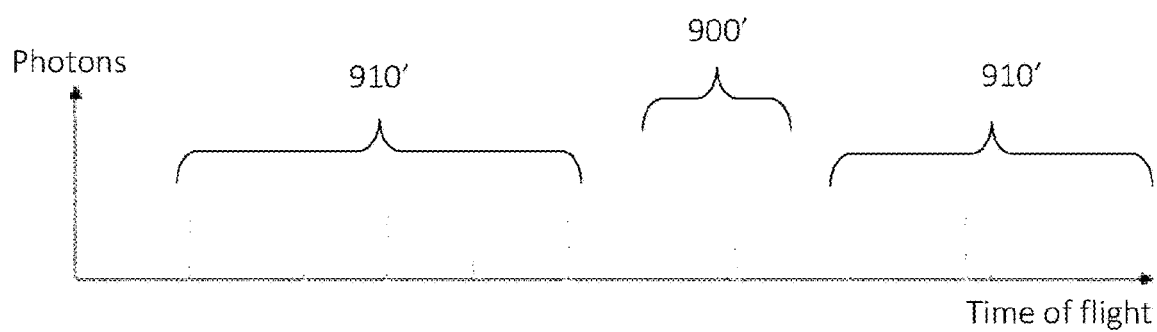

In some embodiments, output by a light detection element owing to detection of background light of the scene can be distinguished from the light return signal owing to reflection of a projected light spot from an object in every measurement. Accordingly, a specific measurement of the background light intensity is not essential. FIG. 9A shows how background photons 910 arrive with random time and can be distinguished from signal photons 900 which cluster in time. FIG. 9A shows signal photons 900 which can be distinguished above background photons 910 because there are enough in a cluster. FIG. 9B shows a situation when there are too few signal photons 900' to identify confidently a cluster from the background photons 910'.

In further embodiments, the at least one signal validation criterion is that the light return signal from a single light detection element (corresponding/directed to a light spot of the light pattern) exceeds a threshold value. In other words, the at least one signal validation criterion is that the light return signal from an active light detection element of the array of light detection elements exceeds a threshold value. In some embodiments, the at least one signal validation criterion is that the light return signal from each active light detection element exceeds the threshold value.

Figure 5:
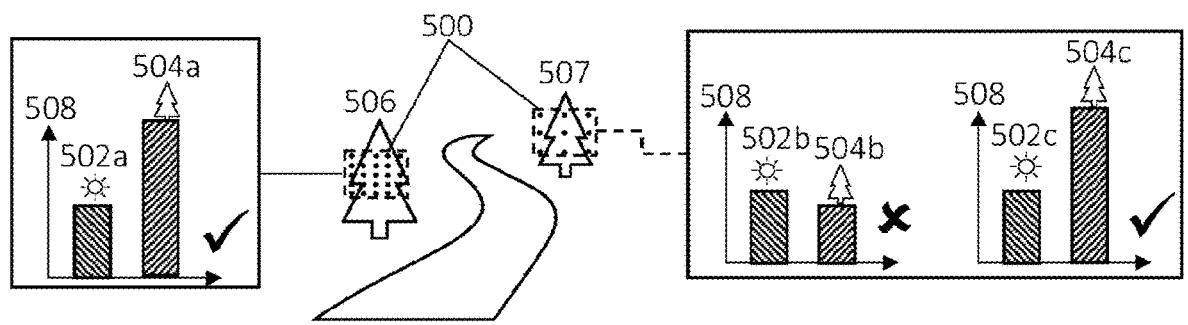
FIG. 5 illustrates an embodiment in which spot density is changed owing to distance.

FIG. 5 shows a scene comprising a near object 506 illuminated by a first (high spot density) light pattern and a distant object 507 illuminated by a second (low spot density) light pattern. In this embodiment, the total brightness 500 of the first light pattern is equal to the total brightness of the second light pattern because the light patterns are formed from respective holograms or sets of holograms. In other embodiments, the total brightness of the first light pattern may be different to the total brightness of the second light pattern.

The three charts shown in FIG. 5 illustrate the light detected 508 from one light spot in three different cases. The first (left-hand side) bar 502a, 502b, 502c of each chart shows the intensity of the background light which is equal in the three cases shown. The second (right-hand side) bar of each chart shows the intensity of the return signal from the corresponding object 506 or 507—that is, the intensity of the light reflected from the object 506 or 507. Bar 504a shows how the return signal from the near object 506 is sufficiently above background as illustrated by bar 502a. In this case, the at least one signal validation criterion is satisfied, and the light return signal is processed in order to obtain point cloud data corresponding to near object 506. In other words, the spot density of the first light pattern 506 was deemed to be acceptable for time of flight measurements. If the distant object 507 is illuminated with the first (high spot density) light pattern, the light return signal is low, as represented by bar 504b. This light return signal may therefore be rejected. In this example, the total intensity of the light return signal is less than the ambient light. In some embodiments, it is the ratio of the signal light to total of signal plus background that is assessed against the at least one signal validation criterion. The distant object 507 is illuminated again with a second (lower spot density) light pattern giving rise to a higher intensity light return signal as illustrated by bar 504c that is deemed to have satisfied the at least one signal validation criterion.

In relation to the distant object 507, the illumination power is distributed over fewer spots (i.e. the density of spots per solid angle is reduced) if the photons detected from the object are low (e.g. for reflection from a distant object). This ensures that valid data is obtained above the noise floor.

Figure 6A:
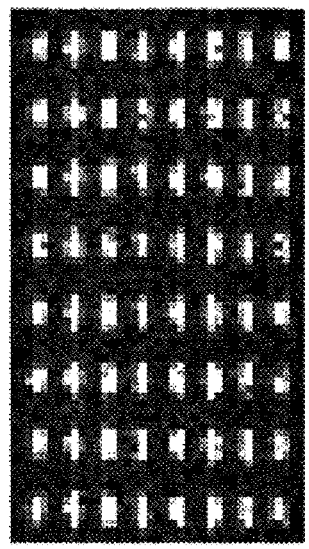
FIGS. 6A and 6B illustrate the problem of detector saturation.
Figure 6B:
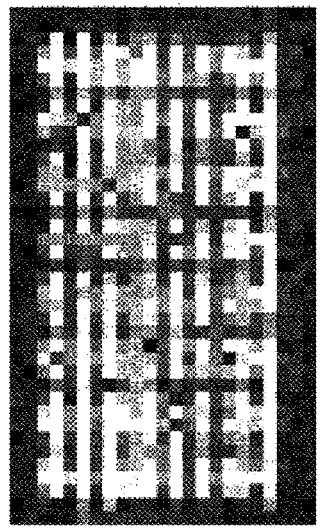

In some embodiments, the number of spots that the illumination power is distributed over is configured to maximise the efficiency of photon detection by an array detector. FIG. 6 shows experimental results using a light detector comprising an array of light detection elements for widely spaced (low spot density) spots (FIG. 6A) and closely spaced (high spot density) spots (FIG. 6B). In this case, when the power is spread over few widely spaced spots some pixels of the detector are saturated (white in the figures) and many pixels barely measure any photons (near black in the figures). It may be said that there is an imbalance between inactive pixels and active pixels of the detector array, in particular there are too many underutilised inactive pixels. This is inefficient detection-many photons that could be measured are not measured. If the same power is distributed over more spots the detector pixels are more uniformly illuminated. This is optimum efficiency of detection. In some embodiments, the density of spots (per solid angle) is adjusted for a particular region of the scene based on result from the previous light return (or previous point cloud frame).

In some embodiments, the method comprises measuring one photon for each "exposure time" of the sensor. More specifically, the method comprises measuring the time of arrival of the first photon to arrive within the exposure period. All subsequent photons may be ignored. Consequently, in some embodiments, saturation is achieved when more than one photon is expected to be detected by the detector in a given exposure time. In other words, in some embodiments, a light detection element may be considered "saturated" when more than one photon is received in a given exposure time. The skilled person will therefore understand that, more precisely, FIGS. 6A and 6B shows the summation of several exposure times, where for each exposure time the result is 1 (photon) or 0 (no photon). In other words, the results shown in FIGS. 6A and 6B are a greyscale visualization of the number of counts in each pixel (1 or 0) for many exposures.

Figure 7:
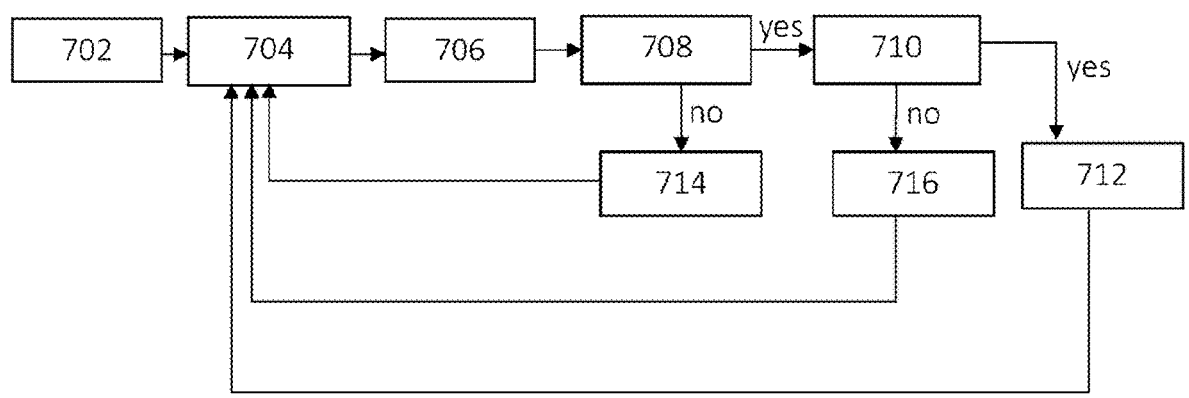
FIG. 7 is a flowchart in accordance with an embodiment.

FIG. 7 shows the flow of a process in accordance with some embodiments. In the embodiment shown, two signal validation criteria are assessed. However, the present disclosure is not limited to this embodiment and either one of the signal validation criteria shown in FIG. 7 may be omitted.

In step 702, a first light pattern is selected for illuminating a region of a scene. The first light pattern has an initial spot pattern density D=D1. Step 704 comprises illuminating the region of the scene with the selected light pattern. Step 706 comprises measuring photons return to the array detector. Step 708 comprises assessing whether the data measured from the region is good—e.g. is there sufficient photon return to generate point cloud data. In other words, step 708 comprises assessing whether a first signal validation criterion is satisfied. If the first signal validation criterion is not satisfied the process progresses to step 714. If the first signal validation criterion is satisfied the process progress to step 710. Step 714 comprises reducing the density of spots in the illumination pattern—i.e. selecting D2, wherein D2<D1. Step 714 is followed by a return to step 704 and a higher signal to noise ratio is expected moving forwards. Step 714 therefore results in a second illumination event using a second light pattern comprises fewer light spots that the first light pattern, such that each light spot is brighter than before. Step 710 comprises assess whether there has been uneven illumination of the detector in relation to the region—e.g. are there saturated detection elements or unused detection elements. In other words, at step 710, if there has not been uneven illumination of the detector, the process progresses to step 716. If there has been uneven illumination of the detector, the process progresses to step 712. Step 716 comprises selecting the same spot density again—that is, retaining the current spot density because operating conditions are deemed to be good. Step 712 comprises increasing the density of spots in the illumination pattern—i.e. selecting D2, wherein D2>D1, such that each light spot is dimmer than before. Step 712 is followed by a return to step 704 and higher detection efficiency is expected moving forwards.

As the skilled person will appreciate, the first validation criterion ensures that a light return signal from each light spot in the scene can be distinguished from background light (i.e. the signal to noise ratio is high) in order to provide valid point cloud data. The second validation criterion ensures that the array of light detection elements is substantially evenly illuminated, so as to minimise interference (e.g. due to crosstalk) and optimise efficiency of detection (i.e. maximise the utilization of the detector array). The skilled person will further appreciate that other validation criteria may be used, either before or after the process flow of FIG. 7, to validate the point cloud data. These criteria may include minimum and maximum thresholds for detected light intensity by light detecting elements, and a maximum threshold for detected light saturation across the detector array.

There is disclosed herein an apparatus for forming a hologram (e.g. phase only hologram) and projecting an illumination pattern into the scene. The apparatus further performs time of flight imaging of reflected photons onto 2D array detector (e.g. SPAD array). Several embodiments for adjusting density of spots in the illumination are envisaged.

In a first set of embodiments, a hologram with large pixel count is used wherein image spots (pixels) in the reconstructed image are enabled or disabled according to the hologram design process. This is most flexible but may be computationally demanding.

Figure 8:
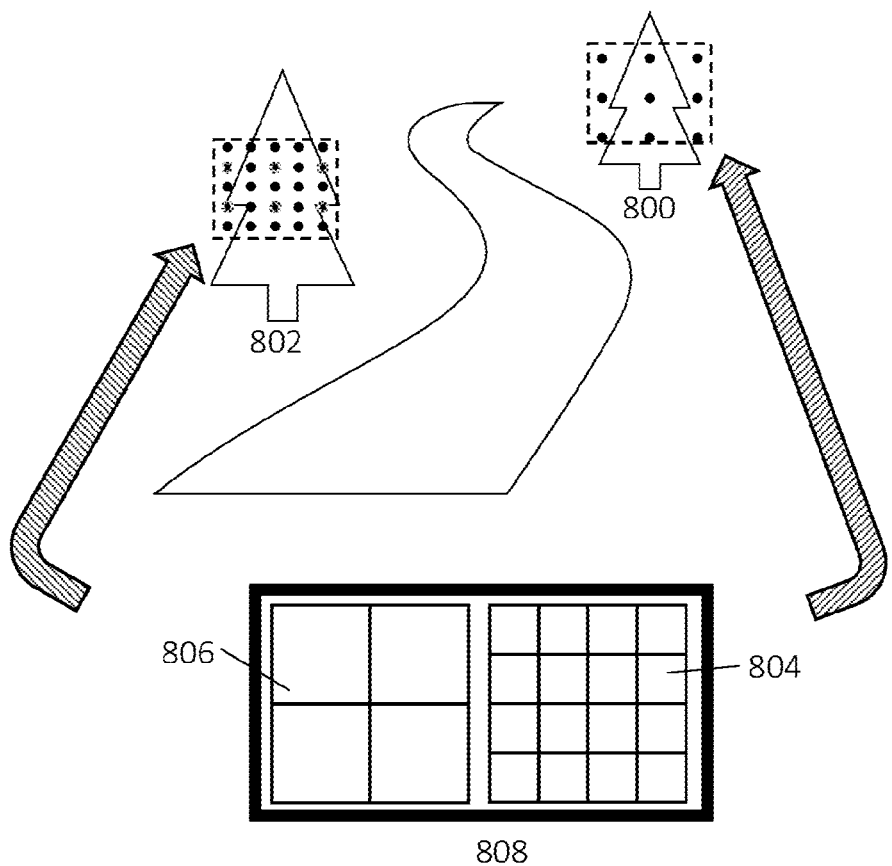
FIG. 8 illustrates the use of hologram tiling to change spot density.

In a second set of embodiments illustrated by FIG. 8, tiling of two or more holograms with different sizes (thereby sampling different numbers of the replay field pixels) is used in which each hologram directs light into different regions of the scene where the pixel density is required.

The controller in accordance with the present disclosure is used as part of a system to project a light pattern (a holographic reconstruction) onto a scene or a region of a scene. The light pattern is changeable in time such as changeable in real-time. The holograms in accordance with the present disclosure comprise a plurality of pixels—for example, [x×y] pixels. If the hologram has fewer pixels than the display device, the hologram may be tiled onto the display device. Tiling uses the extra pixels of the display device to display repeats of at least part of the hologram. Tiling results in the display of a tiled pattern on the display device, wherein the tiled pattern comprises a plurality of tiles. A tile is continuous, contiguous group of pixels of the hologram. The plurality of tiles may comprise any number of full-tiles and any number of part-tiles of the hologram. A full-tile is the complete hologram. That is, a full-tile is the complete, contiguous group of [x×y] pixels of the hologram. A part-tile is a subset of the hologram. That is, a part-tile is a continuous, contiguous subset of the [x×y] pixels of hologram. In some embodiments, tiling is used to fill the display device. That is, tiling may use all pixels of the display device to display the hologram. In some embodiments, all tiles are quadrangular. In some embodiments, all tiles are rectangular. Each tile may have any size or aspect ratio, as required.

The hologram which is repeated on the display device may be referred to as the input hologram because it is the source used for the tiling process. The resultant pattern having tiles which is displayed on the display device may be referred to as the output hologram. The input hologram is an input computer-generated hologram and the output hologram is an output computer-generated hologram. The output hologram displayed on the display device may also be referred to as a light modulation pattern. In summary, the present disclosure encompasses forming output holograms from input holograms using a dynamically-changeable tiling scheme.

Each tiling scheme in accordance with the present disclosure results from a unique pixel mapping scheme which maps groups of contiguous pixels of the input hologram onto the pixels of the output hologram such that all pixels of the output hologram correspond to one pixel of the input hologram. It will therefore be understood that some pixels of the input hologram correspond to multiple pixels of the output hologram. It may be said that there is a one-to-many correlation between at least some pixels of the input hologram and the pixels of the output hologram. The number of tiles may be two to twelve, such as four to ten. Each tile comprises at least two pixels. Each tiling scheme may be selected from a plurality of tiling schemes such as two to twelve tiling schemes. In some embodiments, each tiling scheme is selected from a group comprising four or eight different tiling schemes. In some embodiments, each tiling scheme forms an output hologram comprises at least one full-tile. In some embodiments, a first tiling scheme forms an output hologram comprises four full-tiles and a second, third and fourth tiling scheme comprise one full-tile and eight part-tiles. However, the present disclosure extends to forming output holograms comprising any combination of full-tiles and part-tiles that can fit on the display device.

There is provided a driver for a spatial light modulator. The spatial light modulator comprises [m×n] pixels. The driver is arranged to receive input holograms each comprising [x×y] pixels. In some examples disclosed herein, m≥x and n≥y. In other examples disclosed herein, m>x and/or n>y. The driver is further arranged to drive the spatial light modulator to display thereon output holograms each comprising [m×n] pixels by tiling each input hologram onto the pixels of the spatial light modulator to form an output hologram corresponding to each input hologram using a tiling scheme. The driver is arranged to use a first tiling scheme to display a first output hologram and a second tiling scheme to display a second output hologram. Each output hologram comprises a plurality of tiles of the input hologram. Each tiling scheme defines the size of each tile and the position of each tile on the pixels of the spatial light modulator.

Each output hologram formed by tiling is a continuous light modulation pattern comprises a plurality of tiles of the input hologram, wherein a tile is a continuous, contiguous group of pixels of the input hologram. The tiling scheme is a pixel mapping scheme comprises one-to-many mapping between at least some pixels of the hologram and the pixels of the spatial light modulator.

FIG. 8 shows a spatial light modulator 808 arranged to display a first hologram 806 tiled in accordance with a first tiling scheme and a second hologram 804 tiled in accordance with a second tiling scheme. The second tiling scheme comprises more tiles than the first tiling scheme. The second hologram 804 therefore comprises fewer hologram pixels than the first hologram. The second light pattern formed on a second object 800 using the second hologram has a lower density of light spots than a first light pattern formed on a first object 802 using the first hologram. The second set of embodiments therefore comprise reducing the number of hologram pixels and, optionally, increasing the number of tiles in order to reduce the spot density in the scene. As can be understood from this disclosure such a method may be used if the light return signal fails at least one signal validation criterion. FIG. 8 shows that a large hologram (high number of hologram pixels, low number of tiles) satisfy the at least one signal validation criterion if the object is near—as shown by first object 802—but a smaller hologram (lower number of hologram pixels, higher number of tiles) may be needed in order to satisfy at least one signal validation criterion if the object is distant—such as second object 800.

In a third set of embodiments, the light spot density is changed by changing a hologram interlacing scheme used to form the light patterns. In one embodiment, a first light pattern is formed from two hologram, optionally, displayed and illuminated in quick succession and a second light pattern is formed using just one of the two holograms. The first light pattern may be formed by interlacing a first array of light spots and a second array of lights spots, wherein the light spots of the second array fill in the gaps between the light spots of the first array. The first light pattern may be considered akin to a checkerboard pattern in which the white squares are formed by frame A and the black squares are formed by frame B. The first array of light spots is formed by illuminating a first hologram during a first display event and the second array of light spots is formed by illuminating a second hologram during a second display event. The second light pattern does not therefore comprise the second array of light spots that fill in the gaps between the light spots of the first array. In this embodiment, the spot density of the second light pattern is half the spot density of the first light pattern. More generally, it may be said that one of the light patterns is formed using only a subset of the holograms used to form the other light pattern. The present disclosure extends to any two different schemes in which frames, each comprising a different array of light spots, are selectively included or excluded in order to control spot density. For example, a maximum spot density may be provided by rapidly interlacing in time 2 to 16 such as 2 to 8 frames (i.e. arrays of light spots) and a minimum spot density may be provided using just one frame (i.e. one array of light spots). Optionally, in this embodiment, the single frame forming the minimum spot density may be displayed a plurality of times in order to provide uniform display intervals for the first light pattern and second light pattern.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method for performing light detection and ranging, the method comprising:
   forming a first light pattern within a region of a scene by holographic projection, wherein the first light pattern comprises n light spots arranged in a regular array;
   receiving a light return signal from each light detection element of an array of light detection elements directed at the region of the scene;
   assessing an intensity of the light return signals, and when the light return signals do not meet at least one signal validation criterion based at least in part on the assessing of the intensity of the light return signals, (i) forming a second light pattern within the region of the scene by holographic projection, wherein the second light pattern comprises m light spots arranged in a regular array, wherein m≠n, and (ii) determining a time-of-flight in association with each light spot of the second light pattern.

2. The method for performing light detection and ranging according to claim 1, further comprising:
   determining a background light intensity of the scene.

3. The method for performing light detection and ranging according to claim 2, wherein the at least one signal validation criterion is that a ratio of a total intensity detected by light detection elements directed at a light spot of the first light pattern to the determined background light intensity exceeds a threshold value, and wherein m<n.

4. The method for performing light detection and ranging according to claim 2, wherein the at least one signal validation criterion is that a ratio of a total intensity detected by the array of light detection elements to the determined background light intensity exceeds a threshold value, and wherein m<n.

5. The method for performing light detection and ranging according to claim 3, wherein the threshold value is in a range of 1.4 to 1.6.

6. The method for performing light detection and ranging according to claim 1, wherein the at least one signal validation criterion is that the array of light detection elements has been substantially evenly illuminated and m>n.

7. The method for performing light detection and ranging according to claim 6, wherein the at least one signal validation criterion is that a number light detection elements that have been saturated is less than a threshold number of light detection elements.

8. The method for performing light detection and ranging according to claim 1, wherein the at least one signal validation criterion is that a number of light detection elements receiving light of the first light pattern is greater than a threshold number of light detection elements.

9. The method for performing light detection and ranging according to claim 1, wherein each light pattern is a holographic reconstruction formed by illuminating a respective hologram displayed on a spatial light modulator.

10. The method for performing light detection and ranging as claimed in claim 9, wherein a first hologram corresponding to the first light pattern comprises a first number of pixels and a second hologram corresponding to the second light pattern comprises a second number of pixels, wherein the second number of pixels is different to the first number of pixels.

11. The method for performing light detection and ranging according to claim 9, wherein a first hologram corresponding to the first light pattern is displayed on the spatial light modulator in accordance with a first tiling scheme and a second hologram corresponding to the second light pattern is displayed on the spatial light modulator in accordance with a second tiling scheme, wherein the second tiling scheme is different from the first tiling scheme.

12. The method for performing light detection and ranging according to claim 1, wherein at least one of the first light pattern and second light pattern is formed by rapidly interlacing in time a plurality of different holographic reconstructions from a respective plurality of different holograms.

13. The method for performing light detection and ranging a according to claim 12, wherein a number of holograms forming the first light pattern is different from a number of holograms forming the second light pattern.

14. The method for performing light detection and ranging according to claim 12, wherein the regular array of n light spots of the first light pattern is a subset of the regular array of m light spots of the second light pattern, or vice versa.

15. The method for performing light detection and ranging according to claim 14, wherein the first light pattern is formed by interlacing in time an array of m light spots formed from a first hologram and an array of x light spots formed from a second hologram, and wherein the second light pattern is formed entirely from the first hologram.

16. The method for performing light detection and ranging according to claim 14 wherein, the second light pattern is formed by interlacing in time an array of n light spots formed from a first hologram and an array of y light spots formed from a second hologram, and wherein the first light pattern is formed entirely from the first hologram.

17. A light detection and ranging system comprising:
a holographic projector configured to form light patterns within a region of a scene, wherein each light pattern comprises a plurality of light spots arranged in an array;
a light detector array that comprises an array of light detection elements directed at the region of the scene; and
a controller configured to:
assess an intensity of light return signals received by the light detector array in response to formation of a first light pattern comprising a regular array of n light spots in the region of the scene, wherein when the light return signals do not meet at least one signal validation criterion based at least in part on the assessed intensity of the light return signals, the controller is further configured to (i) instruct the holographic projector to form a second light pattern within the region of the scene, wherein the second light pattern comprises a regular array of m light spots, wherein m≠n, and (ii) determine a time-of-flight in association with each light spot of the second light pattern.

18. The light detection and ranging system according to claim 17, wherein the light detection and ranging system is further configured to:
determine a background light intensity of the scene, wherein the at least one signal validation criterion is at least one selected from a group comprising:
a ratio of a total intensity detected by light detection elements directed at a light spot of the first light pattern to the determined background light intensity exceeds a threshold value and m<n;
a ratio of a total intensity detected by the array of light detection elements to the determined background light intensity exceeds a threshold intensity value and m<n;
the array of light detection elements has been substantially evenly illuminated and m>n;
a number light detection elements that have been saturated is less than a threshold number of light detection elements and m>n; and
a number of light detection elements receiving light of the first light pattern is greater than a threshold number of light detection elements and m>n.

19. The method for performing light detection and ranging according to claim 4, wherein the threshold value is in a range of 1.4 to 1.6.

20. The method for performing light detection and ranging according to claim 10, wherein a first hologram corresponding to the first light pattern is displayed on the spatial light modulator in accordance with a first tiling scheme and a second hologram corresponding to the second light pattern is displayed on the spatial light modulator in accordance with a second tiling scheme, wherein the second tiling scheme is different from the first tiling scheme.

* * * * *